Dec. 26, 1933.   R. H. ROSENBERG   1,940,884
UNIVERSAL JOINT

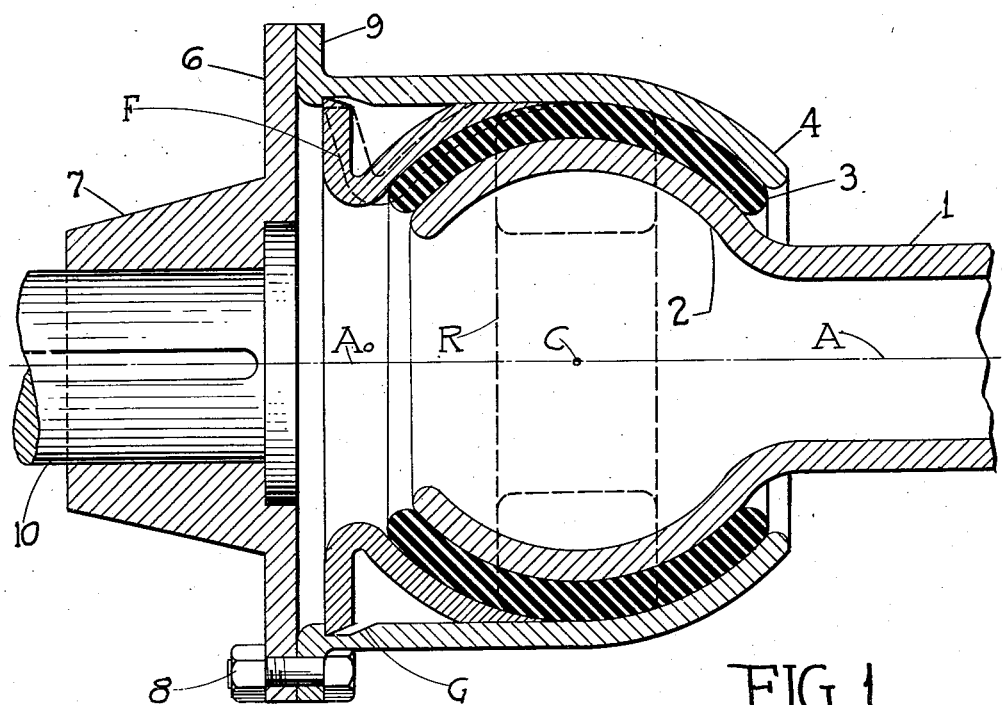
FIG. 1.
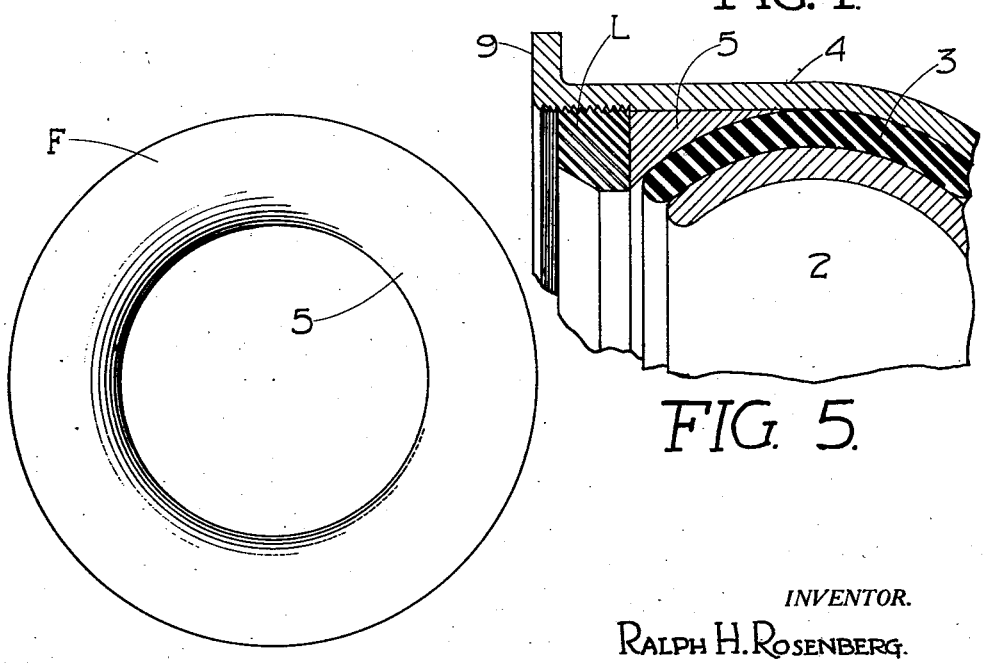
FIG. 2.
FIG. 5.
INVENTOR.
RALPH H. ROSENBERG.
BY *John P. Torboy*
ATTORNEY.

Original Filed Jan. 30, 1930   2 Sheets-Sheet 2

INVENTOR.
RALPH H. ROSENBERG
BY
ATTORNEY.

Patented Dec. 26, 1933

1,940,884

UNITED STATES PATENT OFFICE 1,940,884

UNIVERSAL JOINT

Ralph H. Rosenberg, Detroit, Mich., assignor to Budd Wheel Company, Philadelphia, Pa., a corporation of Pennsylvania Application January 30, 1930, Serial No. 424,519
Renewed January 20, 1933

8 Claims. (Cl. 64—96)

My invention relates to joints between driving and driven members, and more particularly to joints of the kind commonly called universal joints. The possibilities of use in other fields, however, are not precluded by reason of its adaptation to this particular field.

Its primary object is the attainment of a joint of extreme simplicity, of a minimum number of parts, of greatest ease of fabrication and assembly by hand or machine, and resultantly of extremely low cost of manufacture.

Scarcely secondary, and perhaps co-ordinate with the primary object, is the object of producing such a joint at the same time having physical and mechanical characteristics at least equal to and, so far as possible, exceeding those of joints heretofore known.

Thus prominent among its aims are, the attainment of a joint which does not require lubrication, the realization of minimum deterioration and maximum durability, torque transmission without irregularities, a freedom from sudden jerking, an adequacy of cushioning of shocks from all causes, a joint of mechanical and geometrical accuracy, a joint susceptible of wide ranges of angularity between driving and driven shafts, and withal achievement of uniform angular velocity of the driven shaft, irrespective of the angle between the driving and the driven shafts.

These objects are realized by structure consisting in its elemental form of the three parts, to wit:—a driving member and a driven member, one disposed as by telescoping annularly within the other with annular space intervening, and elastic material in the intervening space and having a driving torque bond over an annularly expansive area between the driving and driven members. In one form this driving bond is a frictional driving bond set up by radial pressures derived from deformation of the elastic material, thus causing axial tension or contractive forces within the material itself. In one form of my invention the juxtaposed surfaces of the driving and driven members are concentrically spherically shaped, thus defining a space between them of the geometrical form of a hollow sphere, and imparting to the elastic body between the driving and driven members a similar shape. In this and other forms of my invention the elastic body is live rubber but it may be constituted of other material or structure having similar physical properties.

Of the drawings, Fig. 1 is an axial section of one form of my invention, that particularly referred to above;

Fig. 2 is a detail of a segmental part of the outer annular member;

Fig. 5 is a portion of the axial section of a modification of the form of Fig. 1;

Figure 3:
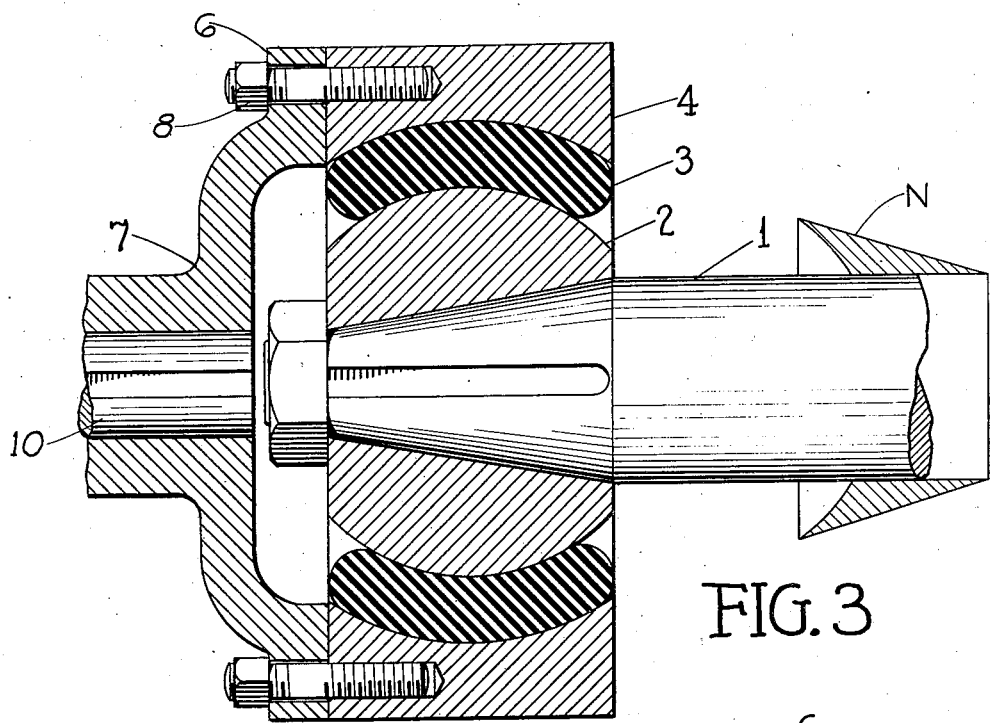
Fig. 3 is an axial section of a second form of my invention.

Considering first the form of Fig. 1, 1 and 10 are respectively driving and driven shafts, the axes A and Ao of which are shown in coincidence but are or are desired to be adjusted at an angle to each other about center C. Connected with shaft 1 is driven member 2 of the joint in this form in the shape of a spherically outer surfaced ball as in a ball and socket joint. Connected with shaft 10 through flange 6 of collar 7 and bolts 8 passing through complemental flange 9 is driven member 4 in the form of a spherically inner surfaced socket member. Members 2 and 4 are spaced from each other and their juxtaposed outer and inner spherical surfaces are concentric about center C and embrace an annular space between them in general of the form of a zone of a hollow sphere. In this annular space is intervened a live rubber body 3 in substantial tension substantially throughout its mass in the general direction of the axes A and Ao of the joint, and thereby exerting substantial radial pressures against the expansive annular areas of the juxtaposed spherical surfaces of members 2 and 4.

The radial pressures of body 3 over the expansive juxtaposed areas of members 2 and 4 are sufficient to cause member 3 to grip frictionally each member 2 and member 4. I have discovered that with a mass tension in body 3 readily attainable by compressibly forcing it between members 2 and 4, there is obtained a frictional gripping in a joint of about the size illustrated able to transmit without disruption of the bond from fifty to one hundred percent more maximum driving torque than required in the medium powered automobile of today. At the same time the body 3 will flex annularly in some cases near to ninety degrees without disrupting or slipping the bond. Maximum torque is of course required for such extreme annular flexing. On the other hand, I have discovered that the angle between axes A and Ao may be changed during rotation through a wide range (in some cases as great as forty-five degrees) with a very moderate force. Yet, in neither case is the concentricity of the elements disturbed about center C, and in the latter case, angular driving, the angular velocity of the driven member is uniform. These characteristics make the coupling the ideal universal joint.

Members 2 and 4 may be fabricated of tubing suitably drawn or swaged. They may be made of stampings in halves along the plane of the axes A and Ao, and flash welded together. Each is a very cheap machine fabrication. The spherical inner surface of member 4 in this form is made of two parts, one integral with the main body and the other an internal ring 5 having a flange F locked in groove G of the main body. This latter is for the purpose of carrying out the method of unit fabrication and assembly.

Figure 6:
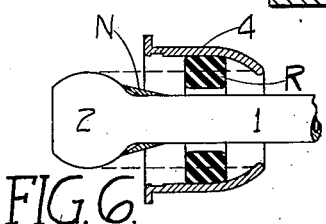
Figs. 6, 7 and 8 are diagrams, respectively, showing the general method of assembly of the joints of Figs. 1 and 5.
Figure 7:
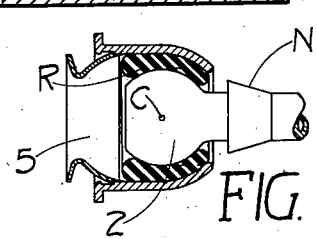
Figure 8:
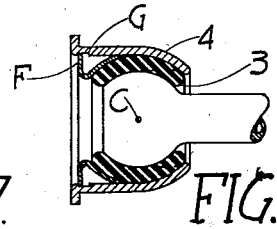

The method is illustrated in Figs. 6 to 8. First as shown in Fig. 6 a live rubber ring R of sufficient mass to constitute the body 3 when placed under mass tension by deformation is inserted in the member 4 from its left or large end. See also the dotted showing of ring R in Fig. 1. Before assembly all parts are greased all over. This ring is initially of an annular cross section transversely of the axes A, Ao greatly in excess of the ultimate cross section of body 3 under mass tension. The axial thickness of the ring R is far less than the ultimate axial length of body 3. Further, ring R is of uniform radial thickness for the purpose of attaining uniform thickness and pressure of body 3 and perfect concentricity. Member 2 has an entrance cone N threaded into shaft 1, and shaft 1 is projected from the left through the ring R in body 4. Member 2 is then forced by relative axial pressure through ring R to the position shown in Fig. 7 in which it is approximately concentric with member 4, and the ring R is deformed under radial pressure to the form indicated. Cone N is then removed. Thereupon ring 5 is inserted from the left end of member 4, and its flange F forced home to groove G. Initially flange G is flared outwardly as shown in dotted lines in Fig. 1, but bent inwardly under axial pressure to the full line form achieving the locking action. Ring R is by this step deformed now to the full hollow spherical form of body 3 of Fig. 1. By somewhat over-distorting body 3 as indicated by the dotted lines of ring 5 in Fig. 1, in the spring back body 3 may move ring 5 back until flange F abuts the outer wall of groove G and may the more deeply lock in place.

A modification of this form of Fig. 1 is shown in Fig. 5. Here locking ring 5 which completed the spherical surface of member 4 is without a flange F. Instead a locking collar L is threaded into the member 4 behind it. Numerous other ways of holding ring 5 in place may doubtless be evolved.

In each of these forms the outer diameter of member 2 is greater than the diameter of end opening in either member 4 or its ring 5, and it is primarily to permit passage of member 2 axially into annular relation to member 4 that ring 5 is used. It is not essential in fabricating member 3 of ring R.

Figure 4:
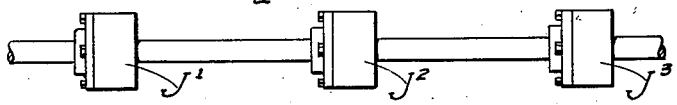
Fig. 4 is a diagrammatic illustration of a flexible shaft constituted by a number of these couplings in series.
Figure 9:
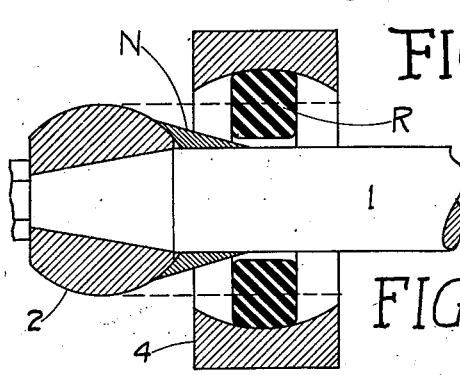
Fig. 9 is a similar diagrammatic view showing the method of assembly of the joint of Fig. 3.

The form of Fig. 4 illustrates this. Here member 4 is in one piece, carrying integrally its entire spherical inner surface. Spherical member 2 is of less outer diameter than the end openings in member 4. The assembly is therefore simplified. It is diagrammed in Fig. 9. The cone N is used on shaft 1 as before to ease the forcible entrance of member 2 in ring R. Upon being forced to concentricity with member 4 it immediately and fully distorts ring R to constitute it the body 3 of Fig. 4. Cone N is as before removed.

Fabricated by either of these methods the joint per se embraces essentially but the three principal elements, driving and driven elements 2 and 4 and the intervened body under deformation generating the radial pressure which causes it to grip frictionally members 2 and 4 for all purposes, independently of other bonds and interlocks, and without the slightest necessity for them.

Clearly I have attained in this simple structure each and all the objects of my invention. They are attained so fully indeed that the structure can be modified in detail without forfeiting them.

Thus I would have it understood that I may widely vary the form of the annularly related members 2 and 4 and the intervened member 3. The surface curvature may be extremely small, or extremely great. Cylindrical surfaces are practicable for small angular adjustments of axes A and Ao. The bonded surfaces of members 2 and 4 may indeed be nonconcentric. A spherical member 2 may be juxtaposed to a cylindrical member 4 and has considerable advantage.

The bonding body 3 may also take other forms, be made of different material, and fabricated by other method. Thus I may concentrically assemble members 2 and 4, pack the intervening space with raw rubber, and vulcanize it in situ accomplishing the bond through adherence of the vulcanized rubber to the surfaces between which it is packed. Such a body 3 has at least relatively less mass tension and is not dependent wholly upon it if at all for bonding. It may well be bonded by both adhesion and friction. So too the softness or hardness of the rubber may be varied to suit various individual driving conditions.

Manufactured so simply and economically my joint is especially applicable to the fabrication of multiple jointed shafts or flexible shafts as illustrated in Fig. 10 in which three such joints J1, J2, and J3 are shown connecting four angularly disposed shaft sections.

The elastic bonding body 3 in the forms illustrated in the drawings is under a relatively high degree of axial mass tension incident to a relatively high degree of deformation of the initial ring R. This mass tension is of course in reality but its strong tendency to regain its original shape against the reaction of members 2 and 4, which members retain it in deformed condition through a reactive force we commonly term compression, but fundamentally the mass tension of body 3 permanently exerts a high degree of radial pressure outwardly of the body 3. The sufficiency of the surface contact bond to substantially solely transmit the maximum driving torque is a result of these relatively high forces derived from the mass tension.

In the instance of the bond derived through vulcanizing I may in addition subject the body 3 to a mass tension of more or less high degree by suitable distortion.

The torque transmitting surfaces of members 2, 3 and 4 and indeed these members themselves may any or all of them be annularly or axially discontinuous in certain forms. The surfaces may be uniformly roughened or uniformly shallowly contoured in various ways to increase the area of bonded surface for given general dimensions of members 2, 3 and 4, thereby increasing the strength of the bond without mechanical interlock of the kind or degree required for heavy torque transmission directly thereby.

The annexed claims should therefore be interpreted by the generic spirit of the invention as influenced by the environment of the prior art rather than the circumstantial terminology used in claims and specification.

What I claim is:

1. A universal joint comprising spaced concentric inner and outer driving and driven members disposed about the principal axes of the shafts connected thereby, and a complementally surfaced deformable elastic device occupying the space between said driving and driven members and deformed so as to grip the surfaces of said members sufficiently to effect the driving connection between said driving and driven members, the inner of said members being convex in longitudinal cross section.

2. A universal joint comprising spaced concentric inner and outer driving and driven members disposed about the principal axes of the shafts connected thereby, and a complementally surfaced deformable elastic device occupying the space between said driving and driven members and deformed so as to grip the surfaces of said members sufficiently to effect the driving connection between said driving and driven members, both of said driving and driven members having surfaces complementally curvilinear in longitudinal cross section and substantially circular in transverse section.

3. A universal joint comprising spaced concentric inner and outer driving and driven members disposed about the principal axes of the shafts connected thereby, and a complementally surfaced deformable elastic device occupying the space between said driving and driven members and deformed so as to grip the surface of said members sufficiently to effect a driving connection between said members, the inner one of said members being convex in longitudinal cross section, the space occupied by said elastic device being substantially free of projections from said driving or driven members.

4. A universal joint comprising spaced concentric inner and outer driving and driven members disposed about the principal axes of the shafts connected thereby, and a complementally surfaced annulus of live rubber held in said space under a condition of substantial deformation, the inner one of said members being convex in longitudinal cross section.

5. A universal joint comprising spaced concentric inner and outer driving and driven members disposed about the principal axes of the shafts connected thereby, and a complementally surfaced annulus of live rubber held in said space under a condition of substantial elongation, the inner one of said members being convex in longitudinal cross section.

6. A flexible coupling comprising driving and driven inner and outer members having torque transmitting surfaces of approximately circular contour in transverse section, free of substantial radial projections and extending axially of and concentrically about the principal axes of the joint with a radial space between them, and a complementally surfaced live rubber body held in said space under a condition of substantial deformation, the inner one of said members being convex in longitudinal cross section.

7. A universal joint comprising driving and driven members having torque transmitting surfaces free of radial projections of substantial degree and extending axially of and annularly about the principal axes of the joint with radial space between them, said torque transmitting surfaces being substantially spherical and concentric, and a complementally surfaced device of live rubber under substantial deformation in said space between said torque transmitting surfaces.

8. An oscillating joint comprising in combination, an inner member made up of a substantially spherical portion and a shank adapted to be secured to one of the members to be joined, an outer member adapted to be secured to the other member to be joined and a rubber bushing held in deformed condition between said inner and outer members and gripping the spherical surface of said inner member and the surface of said outer member, whereby relative movement between the contacting surfaces of said bushing and said members is prevented, said bushing being spaced from the shank of said inner member to permit angular movement of the latter.

RALPH H. ROSENBERG.